United States Patent
Hung et al.

(10) Patent No.: US 10,270,361 B2
(45) Date of Patent: Apr. 23, 2019

(54) HIGH SPEED SYNCHRONOUS RECTIFIER

(71) Applicant: MediaTek Inc., Hsin-Chu (TW)

(72) Inventors: Yun-Yoa Hung, Kaohsiung (TW); Ming Chiang Ting, Hsinchu (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 15/150,886

(22) Filed: May 10, 2016

(65) Prior Publication Data
US 2017/0149353 A1    May 25, 2017

Related U.S. Application Data

(60) Provisional application No. 62/259,665, filed on Nov. 25, 2015.

(51) Int. Cl.
*H02M 7/217* (2006.01)
*H02M 1/08* (2006.01)
*H02M 7/219* (2006.01)

(52) U.S. Cl.
CPC ............ *H02M 7/217* (2013.01); *H02M 1/08* (2013.01); *H02M 7/219* (2013.01); *H02M 2007/2195* (2013.01); *Y02B 70/1408* (2013.01)

(58) Field of Classification Search
CPC .. H02M 1/08; H02M 2001/0009; H02M 1/38; H02M 3/156; H02M 3/1588; H02M 3/33546; H02M 7/00; H02M 7/217
See application file for complete search history.

(56) References Cited

U.S. PATENT DOCUMENTS

2013/0215657 A1*  8/2013  Heath ..................... H02M 1/38
                                                          363/127

OTHER PUBLICATIONS

Choi, Jun-Han et al., "A Resonant Regulating Rectifier (3R) Operating at 6.78 MHz for a 6W Wireless Charger with 86% Efficiency," ISSCC Dig. Tech. Papers, 2013, pp. 64-66.
Lee, Hyung-Min et al., "An Integrated Power-Efficient Active Rectifier with Offset-Controlled High Speed Comparators for Inductively Powered Applications," IEEE Trans. Circuits Syst. I: Reg. Papers, vol. 58, No. 8, Aug. 2011, pp. 1749-1760.
Lee, Hyung-Min, "An Adaptive Reconfigurahle Active Voltage Doubler/Rectifier for Extended-Range Inductive Power Transmission," ISSCC Dig. Tech. Papers, 2012, pp. 286-288.
Lee, Hyung-Min et al., "An Adaptive Reconfigurahie Active Voltage Doubler/Rectifier for Extended-Range Inductive Power Transmission," IEEE Trans. Circuits Syst. II: Express Papers, vol. 59, No. 8, Aug. 2012, pp. 481-485.
Moh, Kyung-Goo et al., "A Fully Integrated 6W Wireless Power Receiver Operating at 6.78MHz with Magnetic Resonance Coupling," ISSCC Dig. Tech. Papers, 2015, pp. 230-232.

* cited by examiner

*Primary Examiner* — Henry Lee, III
(74) *Attorney, Agent, or Firm* — Wolf, Greenfield & Sacks, P.C.

(57) ABSTRACT

A control circuit and method for a synchronous rectifier having a plurality of switches and receiving an AC input signal. The control method includes switching between controlling a first switch of the plurality of switches in response to a control signal for a second switch of the plurality of switches, controlling the first switch in response to a comparison between the AC input signal and a second signal.

14 Claims, 10 Drawing Sheets

HIGH SPEED SYNCHRONOUS RECTIFIER

CROSS REFERENCE TO RELATED APPLICATIONS

This application claims priority to U.S. Provisional Application Ser. No. 62/259,665, titled "Non-Symmetric Mode Synchronous Rectifier," filed Nov. 25, 2015, which is hereby incorporated by reference in its entirety.

BACKGROUND

1. Technical Field

The techniques described herein relate to control circuits and methods for a synchronous rectifier.

2. Discussion of the Related Art

A synchronous rectifier is a rectifier implemented by transistors rather than diodes. A control circuit controls the timing of switching the transistors based on the received AC waveform to mimic the switching on and off of the diodes in a conventional rectifier. Synchronous rectifiers can have improved efficiency over rectifiers implemented by diodes due to the lower voltage drop across them during conduction.

Wireless Power Transfer Systems (WPTS) are gaining increasing popularity as a convenient way to deliver power without wires or connectors. WPTS currently under development in the industry can be separated into two major classes: magnetic induction systems and magnetic resonance (MR) systems. Both types of systems include a wireless power transmitter and a wireless power receiver. Such systems can be used to power or charge mobile battery-powered devices such as smartphones, or tablet computers, for example, among other applications.

Inductive WPTS typically operate in an allocated frequency range of several hundred kilohertz using frequency variation as a power control mechanism. MR WPTS typically operate on a single frequency using input voltage regulation to control output power. In typical applications, MR WPTS operate at a frequency of 6.78 MHz.

Several industry committees such as the Wireless Power Consortium (WPC), the Alliance for Wireless Power/Power Matters Alliance (A4WP/PMA) are working on developing international standards for consumer products based on wireless power transfer.

SUMMARY

Some embodiments relate to a control method for a synchronous rectifier having a plurality of switches, which receives an AC input signal. The control method includes switching between controlling a first switch of the plurality of switches in response to a control signal for a second switch of the plurality of switches, and controlling the first switch in response to a comparison between the AC input signal and a second signal.

Some embodiments relate to a control circuit having circuitry configured to perform the control method.

Some aspects of the present application may be used in a wireless power transfer system, such as in a wireless power receiver. However, the circuits and methods described herein are not limited to use in a wireless power transfer system, and may be used in other synchronous rectifier applications.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

As discussed above, synchronous rectifiers can provide improved efficiency over rectifiers implemented with diodes. The inventors have appreciated, however, that synchronous rectifiers can have reduced efficiency due to power loss mechanisms arising due to the manner in which the synchronous rectifier is controlled. Described herein are control techniques and control circuits that can improve the efficiency of synchronous rectifiers.

Figure 1A:
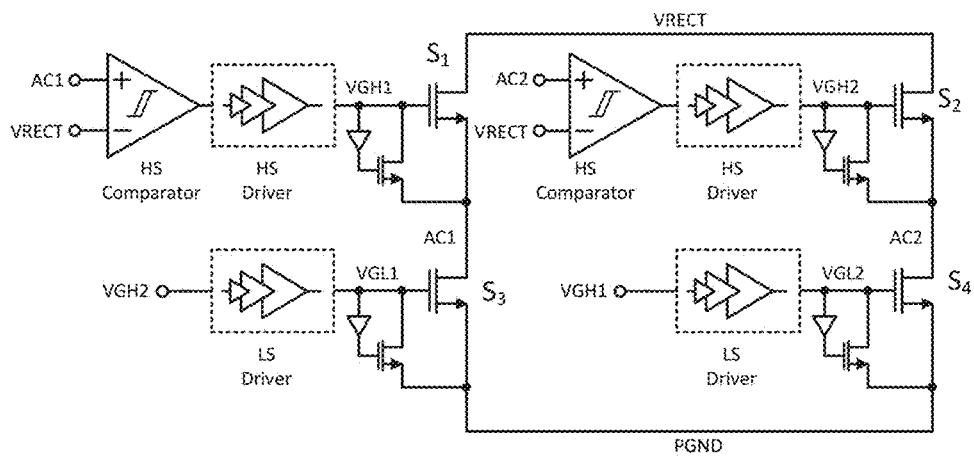
FIG. 1A shows a diagram of a control circuit that is configured to control a synchronous rectifier in "symmetric mode."
Figure 1B:
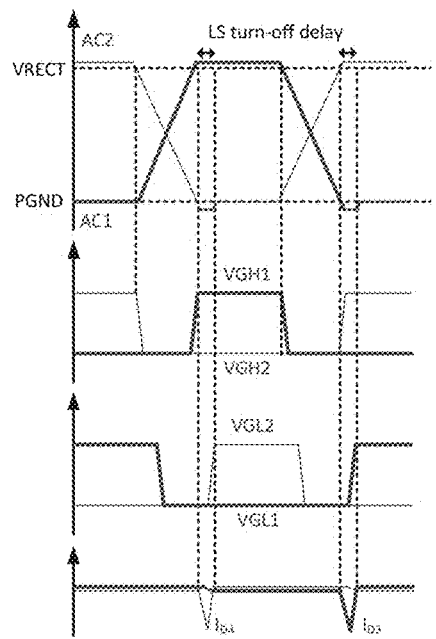
FIG. 1B shows voltage waveforms and diode current waveforms of the circuit of FIG. 1A.
Figure 1C:
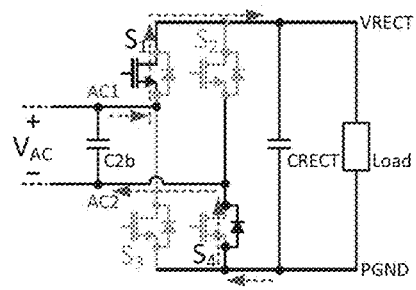
FIG. 1C shows power losses are incurred due to current that flows through the body diode of transistor S4 when AC2 goes low.

FIG. 1A shows a diagram of a control circuit that is configured to control a synchronous rectifier in "symmetric mode." In symmetric mode, the high-side switch S1 is controlled to be turned on by signal VGH1 when the AC input voltage AC1 is higher than the output voltage VRECT, and the high-side switch S2 is controlled to be turned on by signal VGH2 when the AC input voltage AC2 is higher than a VRECT. The control mode is termed "symmetric mode" because the low-side switches are controlled by the same control signal as their high-side counterpart on the opposite side of the rectifier bridge. Specifically, low-side switch S3 is controlled by VGH2 which controls switch S2. Low-side switch S4 is controlled by VGH1 which controls switch S1. FIG. 1B shows voltage waveforms and diode current waveforms of the circuit of FIG. 1A. As illustrated in FIG. 1C, power losses are incurred due to current that flows through the body diode of transistor S4 when AC2 goes low.

Figure 2A:
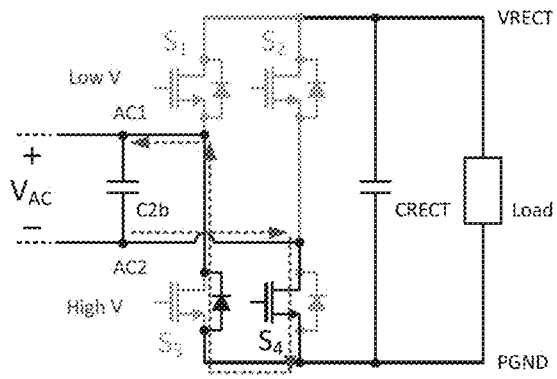
FIG. 2A shows a synchronous rectifier controlled in "non-symmetric mode".
Figure 2B:
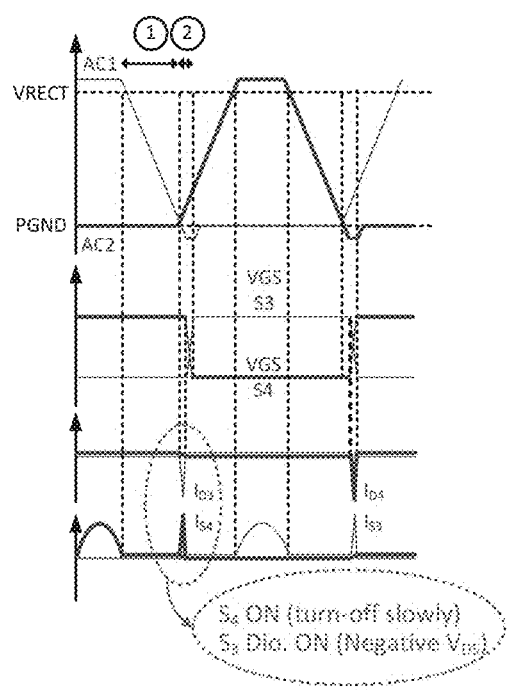
FIG. 2B shows a voltage waveforms and diode current waveforms of the circuit of FIG. 2A.

FIG. 2A shows a synchronous rectifier controlled in "non-symmetric mode". FIG. 2B shows voltage waveforms and diode current waveforms of the circuit of FIG. 2A. Since switch S4 turns off slowly, and the body diode of switch S3 is on due to AC1 being lower than PGND, there is an AC short-through path through the body diode of switch S3 while S4 is still on, which leads to power losses.

Since the power loss mechanisms described above occur during each period of the AC input waveform, the power losses are proportional to the frequency of the AC input waveform. For applications such as wireless power transfer, in which the AC input waveform may have a frequency in the kHz to MHz range, the power losses due to these mechanisms can be significant. The techniques described herein may improve efficiency for such applications, such as wireless power transfer in accordance with standards promulgated by A4WP, PMA, A4WP/PMA, including Rezence, by way of example and not limitation.

Figure 3A:
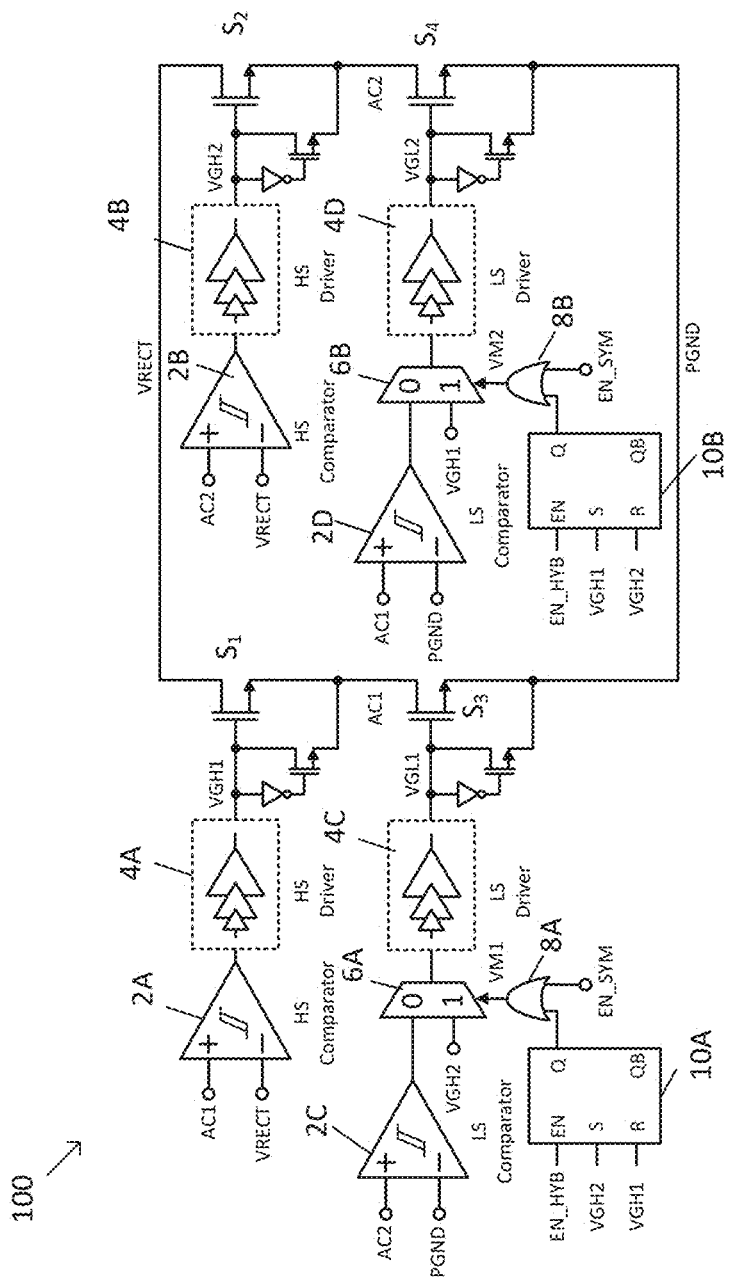
FIG. 3A shows a control circuit which implements a control technique that can improve the efficiency of a synchronous rectifier by switching between different control modes during the period of the AC input waveform.

FIG. 3A shows a control circuit 100 which implements a control technique that can improve the efficiency of a synchronous rectifier by switching between symmetric and non-symmetric mode for the low-side switches S3 and S4 during the period of the AC input waveform, according to some embodiments. The synchronous rectifier includes switches S1-S4, which may be realized as field effect transistors, bipolar transistors, or any other suitable type of transistors. As used herein, the gate voltage (e.g., VGH, VGL) applied to the illustrated MOSFETs are gate-source voltages.

Control circuit 100 includes circuitry for controlling the switches S1-S4 of the synchronous rectifier. High-side switch S1 is controlled by a comparator 2A, which performs a comparison between the AC input signal AC1 and the rectified output voltage VRECT. High-side switch S1 is turned on when AC1 is higher than VRECT and turned off when AC1 is lower than VRECT. When AC1 is higher than VRECT, the output of comparator 2A is a logic high, and when AC1 is lower than VRECT, the output of comparator 2A is a logic low. The high-side driver 4A drives transistor S1 in response to the output of the comparator 2A. The high-side and low-side drivers 4 may be any suitable buffer or amplifier circuits.

Similarly, high-side switch S2 is controlled by a comparator 2B, which performs a comparison between the AC input signal AC2 and the rectified output voltage VRECT. High-side switch S2 is turned on when AC2 is higher than VRECT and turned off when AC2 is lower than VRECT. When AC2 is higher than VRECT, the output of comparator 2B is a logic high, and when AC2 is lower than VRECT, the output of comparator 2B is a logic low. The high-side driver 4B drives transistor S2 in response to the output of the comparator 2B.

The low-side switches S3 and S4 are controlled by control circuit 100 using control techniques that change during the period of the AC input waveform. In some embodiments, for approximately a half-period of the AC input waveform, and during a period in which switch S3 turns off and switch S4 turns on, switch S3 is controlled in symmetric mode while switch S4 is controlled in non-symmetric mode. Then the control technique flips during a period in which switch S3 turns on and switch S4 turns off, for approximately a half-period of the AC input waveform, such that switch S3 is controlled in non-symmetric mode while switch S4 is controlled in symmetric mode. Such a technique can avoid the power loss mechanisms described above.

Switch S3 can be controlled in symmetric mode by VGH2, or in non-symmetric mode by comparator 2C, which performs a comparison between the AC input signal AC2 and a common mode voltage (e.g., ground voltage PGND). When AC2 is higher than PGND, the output of comparator 2C is a logic high, and when AC2 is lower than PGND, the output of comparator 2C is a logic low. Multiplexor 6A allows selecting the control signal that drives the low-side driver 4C, and thus switch S3. However, the techniques described herein are not limited to a multiplexor, as any suitable selection circuitry may be used. When selection signal VM1 is logic low, the output of the comparator 2C is selected, and the output of the comparator 2C drives switch S3 in non-symmetric mode via low-side driver 4C. When selection signal VM1 is logic high, VGH2 is selected and drives switch S3 in symmetric mode via low-side driver 4C.

Figure 3B:
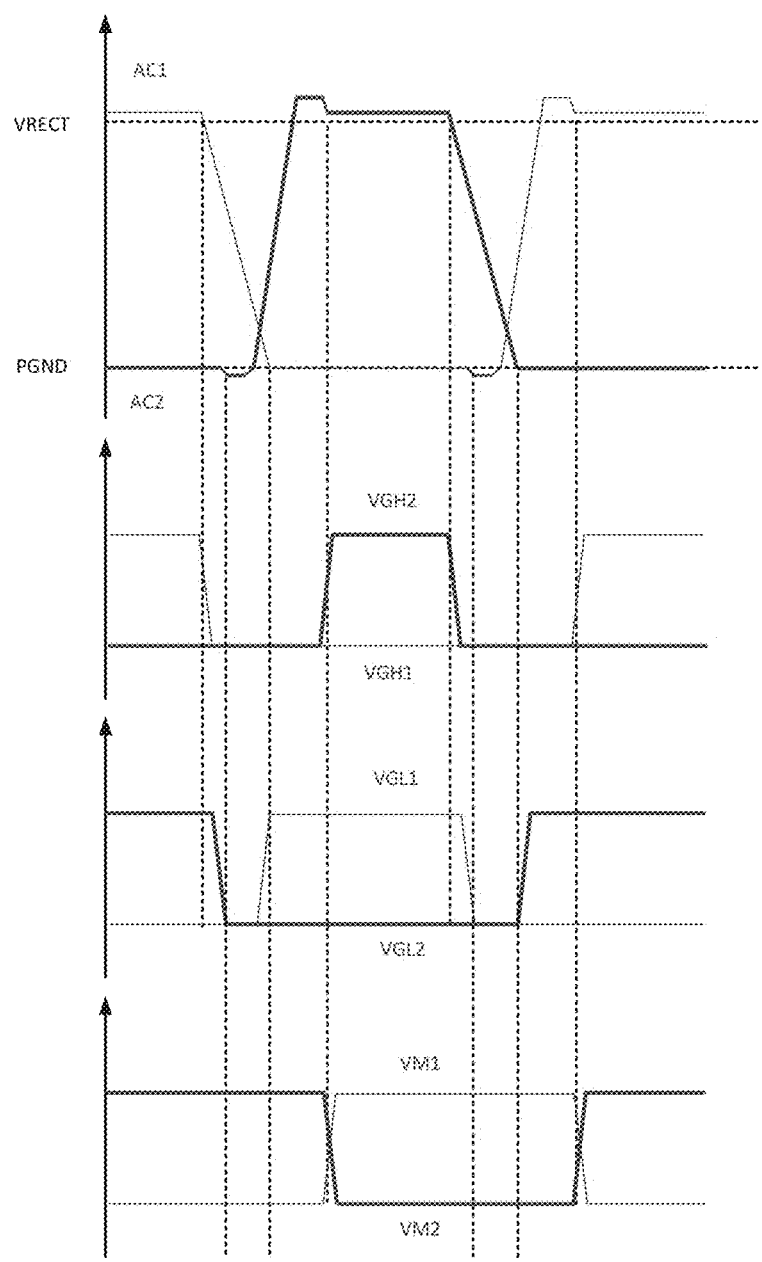
FIG. 3B shows voltage waveforms of the circuit of FIG. 3A.

In some embodiments, VM1 may switch between logic low and logic high in response to a transition of VGH1 and/or VGH2 between logic levels. For example, as illustrated in FIG. 3B, selection signal VM1 switches from logic low to logic high in response to a rising edge of VGH2 that transitions from logic low to logic high. Selection signal VM1 switches from logic high to logic low in response to a rising edge of VGH1 that transitions from logic low to logic high.

Selection signal VM1 may be generated in any suitable way using any suitable circuitry, such as control logic or a controller (e.g., a microprocessor). In the embodiment of FIG. 3A, VM1 is controlled by a latch or flip-flop 10A. When latch or flip-flop 10A is enabled by the signal EN_HYB, it flips the logic level of the output Q in response to a rising transition of VGH1 or VGH2. The output Q may control the multiplexor 6A directly, or indirectly through an OR gate 8A, as shown in FIG. 3A. The OR gate 8A allows forcing the control of transistor S3 to be in symmetric mode by setting the EN_SYM signal to logic high. If the EN_SYM signal is logic low, the output of OR gate 8A is the same as the output Q. It should be appreciated that signals EN_HYB and EN_SYM are provided for flexibility in setting the control mode, and are optional.

Switch S4 may be controlled similarly to S3, but with the opposite control mode. Switch S4 can be controlled in symmetric mode by VGH1, or in non-symmetric mode by comparator 2D, which performs a comparison between the AC input signal AC1 and a common mode voltage (e.g., ground voltage PGND). When AC1 is higher than PGND, the output of comparator 2D is a logic high, and when AC1 is lower than PGND, the output of comparator 2D is a logic low. Multiplexor 6B allows selecting the control signal that drives the low-side driver 4D, and thus switch S4. However, the techniques described herein are not limited to a multiplexor, as any suitable selection circuitry may be used. When selection signal VM2 is logic low, the output of the comparator 2D is selected, and the output of the comparator 2D drives switch S4 in non-symmetric mode via low-side driver 4D. When selection signal VM2 is logic high, VGH1 is selected and drives switch S4 in symmetric mode via low-side driver 4D.

In some embodiments, VM2 may switch between logic low and logic high in response to a transition of VGH1 or VGH2 between logic levels. For example, VM2 may transition at the same time as VM1, with its logic level changing in the opposite direction. As illustrated in FIG. 3B, selection signal VM2 switches from logic high to logic low in response to a rising edge of VGH2 that transitions from logic low to logic high. Selection signal VM2 switches from logic low to logic high in response to a rising edge of VGH1 that transitions from logic low to logic high.

As with selection signal VM1, selection signal VM2 may be generated in any suitable way using any suitable circuitry, such as control logic or a controller. In the embodiment of FIG. 3A, VM2 is controlled by a latch or flip-flop 10B. When latch or flip-flop 10B is enabled by the signal EN_HYB, it flips the logic level of the output Q in response to a rising transition of VGH1 and VGH2. The output Q may control the multiplexor 6B directly, or indirectly through OR gate 8B, as shown. The OR gate 8B allows forcing the control of transistor S4 to be in symmetric mode by setting the EN_SYM signal to logic high. If the EN_SYM signal is logic low, the output of OR gate 8B is the same as the output Q of the latch or flip-flop 10B.

Figure 3C:
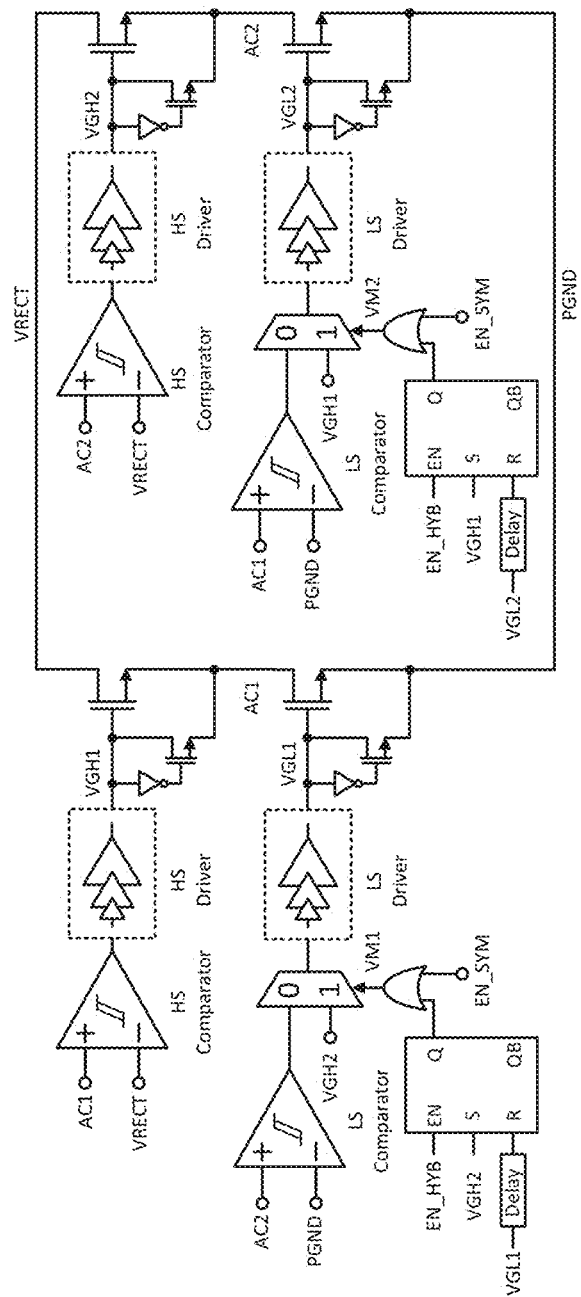
FIG. 3C shows a control circuit in which VGL1 or VGL2 may be used as a trigger for switching between symmetric mode and non-symmetric mode.

In some embodiments, VGL1 or VGL2 may be used as a trigger for switching between symmetric mode and non-symmetric mode. In some embodiments, VM1 may switch between logic high and logic low in response to a transition of VGL1 and/or VGL2 between logic levels. In the example of FIG. 3C, selection signal VM1 switches from logic high to logic low in response to a falling edge of VGL1 that transitions from logic high to logic low. Selection signal VM2 switches from logic high to logic low in response to a falling edge of VGL2 that transitions from logic high to logic low. As shown in FIG. 3C, suitable delays may be introduced to VGL1 and/or VGL2 to set the timing. The delays may be introduced digitally or using analog circuit components.

By controlling the switching of switches S3 and S4 in such a manner, the power loss mechanisms described above can be avoided, and efficiency of the synchronous rectifier can be improved.

Figure 4A:
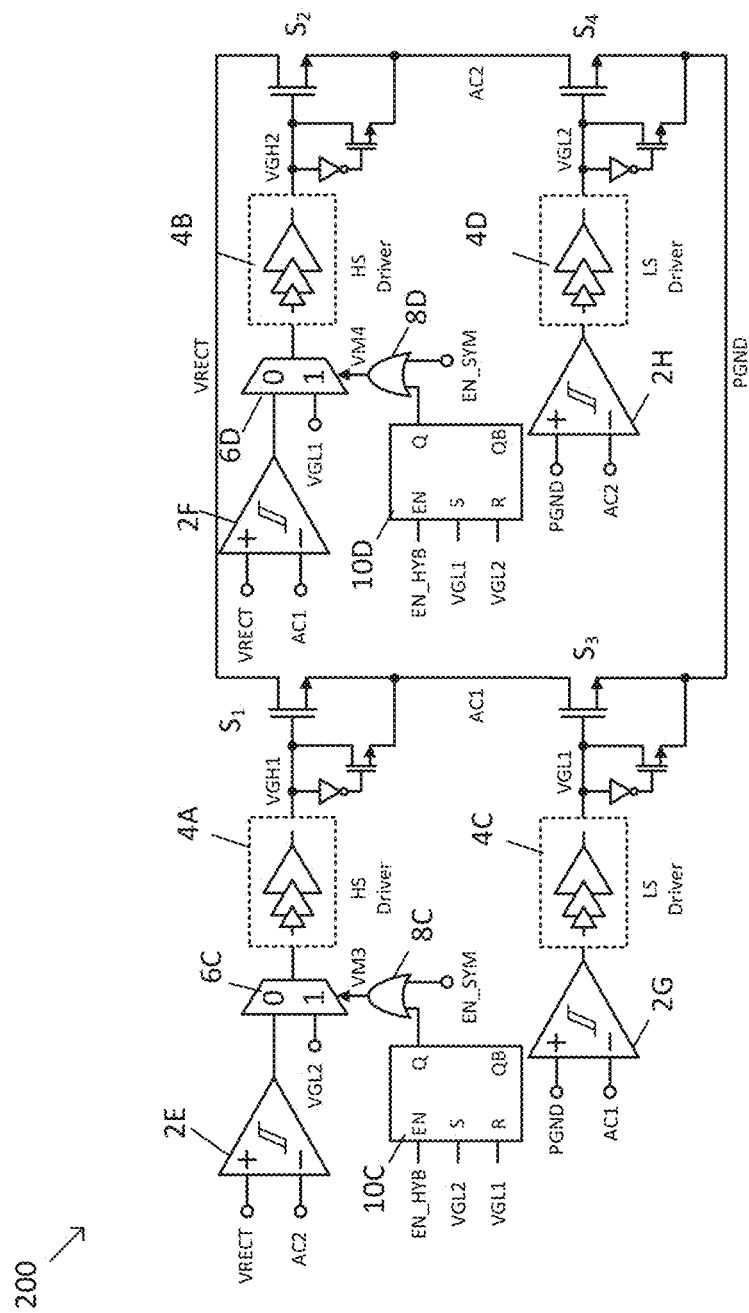
FIG. 4A shows a control circuit that controls the low-side switches S3 and S4 in non-symmetric mode and controls the high-side switches S1 and S2 to switch between symmetric mode and non-symmetric mode.

In some embodiments, the power loss mechanisms can be avoided by switching control of the high-side switches S1 and S2 between symmetric mode and non-symmetric mode. FIG. 4A shows a control circuit 200 that controls the low-side switches S3 and S4 in non-symmetric mode and controls the high-side switches S1 and S2 to switch between symmetric mode and non-symmetric mode, according to some embodiments.

Low-side switch S3 is controlled by a comparator 2G, which performs a comparison between the AC input signal AC1 and common mode voltage (e.g., PGND). Low-side switch S3 is turned on when AC1 is lower than PGND and turned off when AC1 is higher than PGND. When AC1 is lower than PGND, the output of comparator 2G is a logic high, and when AC1 is higher than PGND, the output of comparator 2G is a logic low. The low-side driver 4C drives transistor S3 in response to the output of the comparator 2G.

Similarly, low-side switch S4 is controlled by a comparator 2H, which performs a comparison between the AC input signal AC2 and a common mode voltage (e.g., PGND). Low-side switch S4 is turned on when AC2 is lower than PGND and turned off when AC2 is higher than PGND. When AC2 is lower than PGND, the output of comparator 2H is a logic high, and when AC2 is higher than PGND, the output of comparator 2H is a logic low. The low-side driver 4D drives transistor S4 in response to the output of the comparator 2H.

The high-side switches S1 and S2 are controlled by control circuit 200 using control techniques that change during the period of the AC input waveform. In some embodiments, for approximately a half-period of the AC input waveform, switch S1 is controlled in symmetric mode while switch S2 is controlled in non-symmetric mode, then the control technique flips for another half-period of the AC input waveform, such that switch S1 is controlled in non-symmetric mode while switch S2 is controlled in symmetric mode.

Switch S1 can be controlled in symmetric mode by VGL2, or in non-symmetric mode by comparator 2E, which performs a comparison between the AC input signal AC2 and VRECT. When AC2 is lower than VRECT, the output of comparator 2E is a logic high, and when AC2 is higher than VRECT, the output of comparator 2E is a logic low. Multiplexor 6C allows selecting the control signal that drives the high-side driver 4A, and thus switch S1. When selection signal VM3 is logic low, the output of the comparator 2E is selected, and the output of the comparator drives switch S1 in non-symmetric mode via high-side driver 4A. When selection signal VM3 is logic high, VGL2 is selected and drives switch S1 in symmetric mode via high-side driver 4A.

Figure 4B:
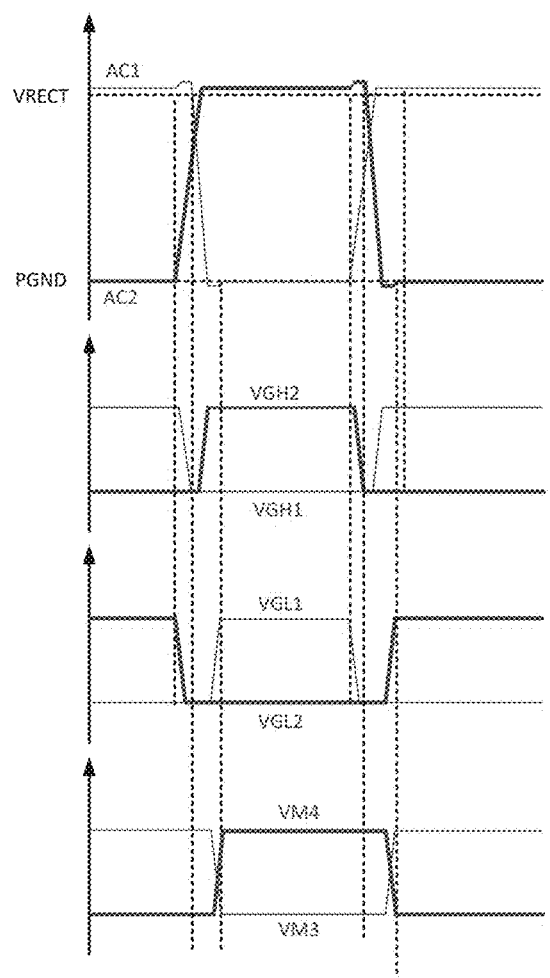
FIG. 4B shows voltage waveforms of the circuit of FIG. 4A.

In some embodiments, VM3 may switch between logic low and logic high in response to a transition of VGL1 or VGL2 between logic levels. For example, as illustrated in FIG. 4B, selection signal VM3 switches from logic low to logic high in response to a rising edge of VGL2 that transitions from logic low to logic high. Selection signal VM3 switches from logic high to logic low in response to a rising edge of VGL1 that transitions from logic low to logic high.

Selection signal VM3 may be generated in any suitable way using any suitable circuitry, such as control logic or a controller. In the embodiment of FIG. 4A, VM3 is controlled by a latch or flip-flop 10C. When latch or flip-flop 10C is enabled by the signal EN_HYB, it flips the logic level of the output Q in response to a rising transition of VGL1 or VGL2. The output Q may control the multiplexor 6C directly, or indirectly through OR gate 8C, as shown. The OR gate 8C allows forcing the control of transistor S1 to be in symmetric mode by setting the EN_SYM signal to logic high. If the EN_SYM signal is logic low, the output of OR gate 8C is the same as the output Q. It should be appreciated that signals EN_HYB and EN_SYM are provided for flexibility in setting the control mode, and are optional.

Switch S2 may be controlled similarly to S1, but in the opposite control mode. Switch S2 can be controlled in symmetric mode by VGL1, or in non-symmetric mode by comparator 2F, which performs a comparison between the AC input signal AC1 and VRECT. When AC1 is lower than VRECT, the output of comparator 2F is a logic high, and when AC1 is higher than VRECT, the output of comparator 2F is a logic low. Multiplexor 6D allows selecting the control signal that drives the high-side driver 4B, and thus switch S2. However, the techniques described herein are not limited to a multiplexor, as any suitable selection circuitry may be used. When selection signal VM4 is logic low, the output of the comparator 2F is selected, and the output of the comparator 2F drives switch S2 in non-symmetric mode via high-side driver 4B. When selection signal VM4 is logic high, VGL1 is selected and drives switch S2 in symmetric mode via high-side driver 4B.

In some embodiments, VM4 may switch between logic low and logic high in response to a transition of VGL1 or VGL2 between logic levels. For example, VM4 may transition at the same time as VM3, with its logic level changing in the opposite direction. As illustrated in FIG. 4B, selection signal VM4 switches from logic high to logic low in response to a rising edge of VGL2 that transitions from logic low to logic high. Selection signal VM4 switches from logic low to logic high in response to a rising edge of VGL1 that transitions from logic low to logic high.

As with selection signal VM3, selection signal VM4 may be generated in any suitable way using any suitable circuitry, such as control logic or a controller. In the embodiment of FIG. 4A, VM4 is controlled by a latch or flip-flop 10D. When latch or flip-flop 10D is enabled by the signal EN_HYB, it flips the logic level of the output Q in response to a rising transition of VGL1 and VGL2. Output Q may control the multiplexor 6D directly, or indirectly through OR gate 8D, as shown. The OR gate 8D allows forcing the control of transistor S2 to be in symmetric mode by setting the EN_SYM signal to logic high. If the EN_SYM signal is logic low, the output of OR gate 8D is the same as the output Q of the latch or flip-flop 10D.

Figure 4C:
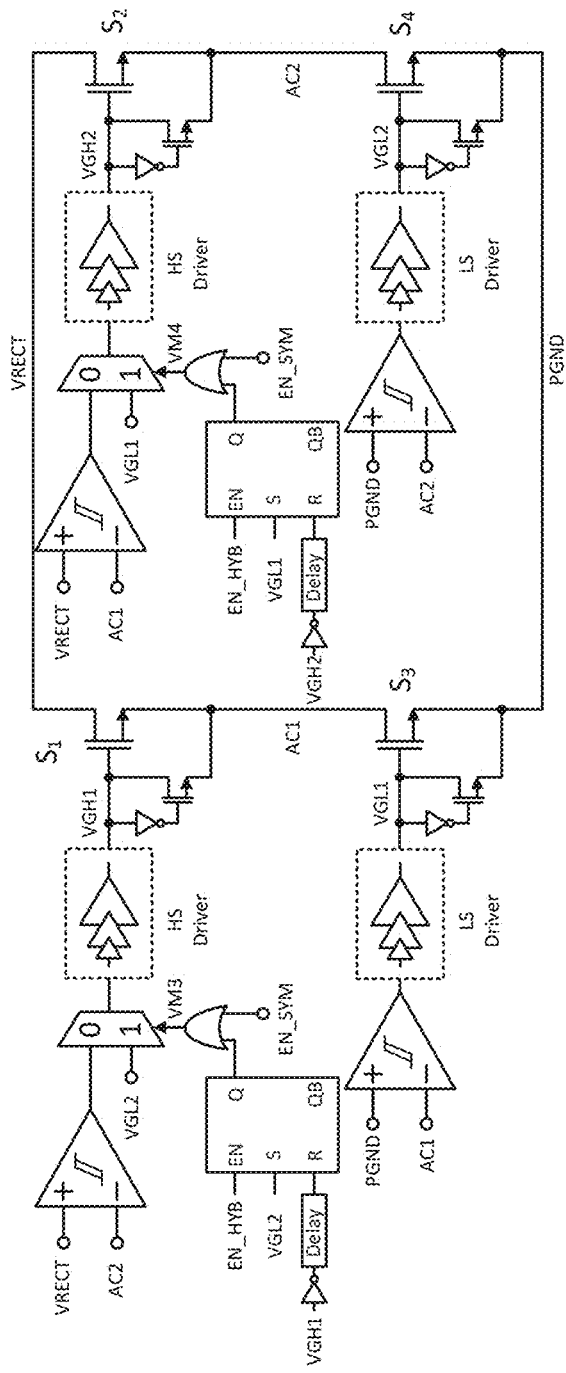
FIG. 4C shows a control circuit in which VGH1 or VGH2 may be used as a trigger for switching between symmetric mode and non-symmetric mode.

In some embodiments, VGH1 or VGH2 may be used as a trigger for switching between symmetric mode and non-symmetric mode. In some embodiments, VM3 may switch between logic high and logic low in response to a transition of VGH1 and/or VGH2 between logic levels. In the example of FIG. 4C, selection signal VM3 switches from logic high to logic low in response to a falling edge of VGH1 that transitions from logic high to logic low. Selection signal VM4 switches from logic high to logic low in response to a falling edge of VGH2 that transitions from logic high to logic low. As shown in FIG. 4C, suitable delays may be introduced to VGH1 and/or VGH2 to set the timing. The delays may be introduced digitally or using analog circuit components.

Figure 5:
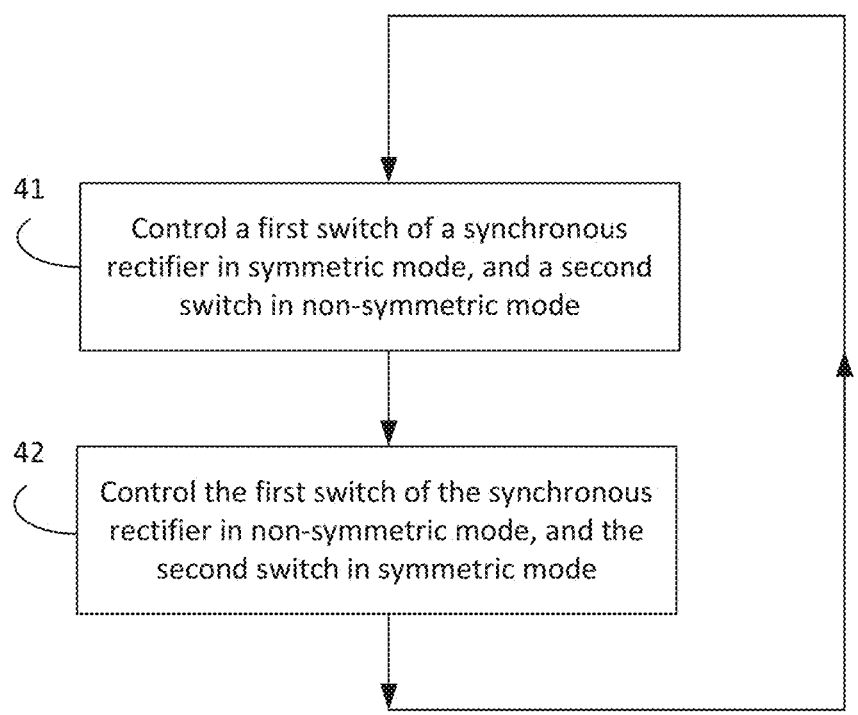
FIG. 5 shows a method of controlling a synchronous rectifier, according to some embodiments.

FIG. 5 shows a method of controlling a synchronous rectifier, according to some embodiments. In step 41, a first switch is controlled in symmetric mode and a second switch is controlled in non-symmetric mode. As discussed above, switch S3 (or S1) may be controlled in symmetric mode and switch S4 (or S2) may be controlled in non-symmetric mode. The switches may be controlled in non-symmetric mode when they switch from the off-state to the on-state, and controlled in symmetric mode when they switch from the on-state to the off-state. In some embodiments, step 41 is performed for a period of time equal to a half-cycle of the AC input waveform. In step 42, the first switch is controlled in non-symmetric mode and the second switch is controlled in symmetric mode. As discussed above, switch S3 (or S1) may be controlled in non-symmetric mode and switch S4 (or S2) may be controlled in symmetric mode. In some embodiments, step 42 is performed for a period of time equal to a half-cycle of the AC input waveform. The method repeats for each cycle of the AC input waveform.

Figure 6:
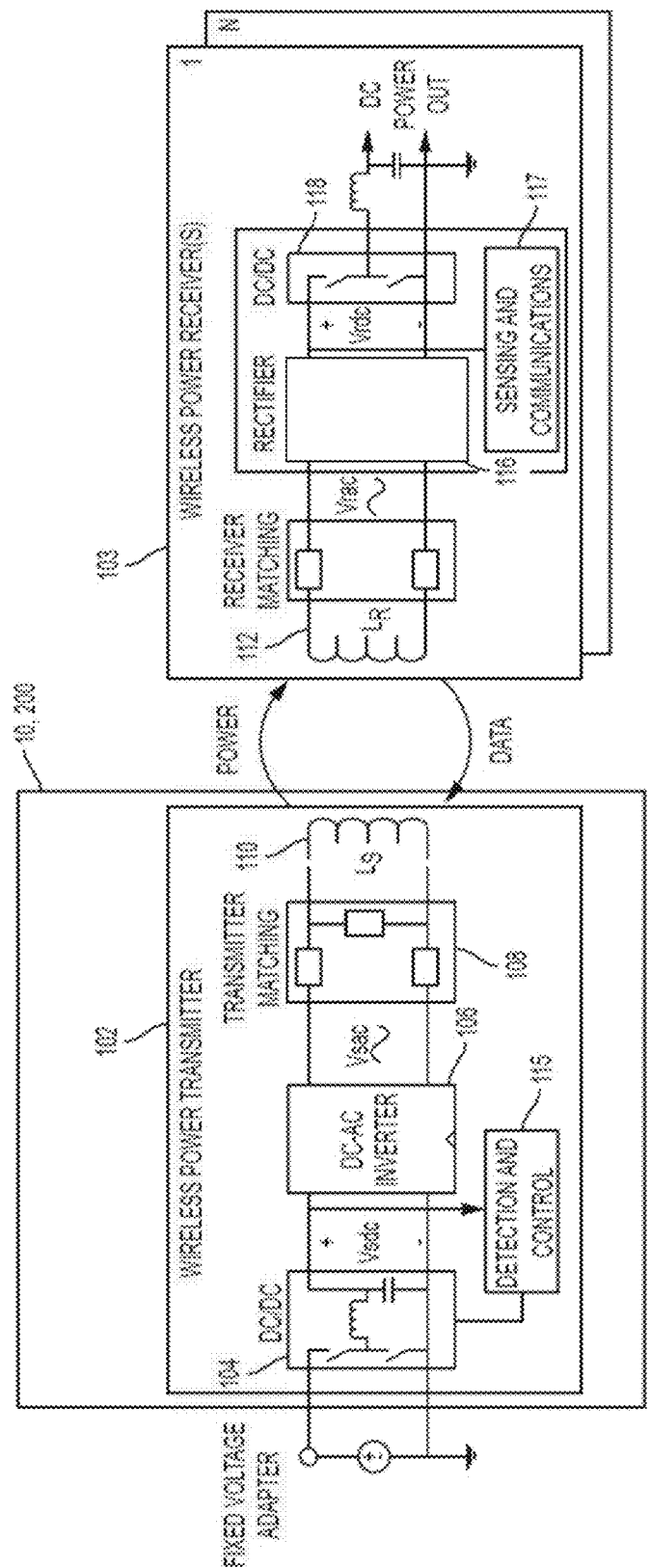
FIG. 6 shows a power chain for a wireless power system.

A synchronous rectifier and control circuit as described herein may be incorporated in a wireless power transmitter or receiver. A power chain for a wireless power system is shown in FIG. 6. The wireless power transmitter 102 receives a fixed voltage from a DC adapter. The fixed adapter voltage is scaled by a DC/DC converter 104 and applied to an inverter 106. However, in some embodiments, the DC adapter output voltage may be controllable, rather than fixed, which may allow eliminating the DC/DC converter 104. The inverter, in conjunction with the transmitter matching network 108, generates an AC current in the transmit coil(s) 110. The AC current in the transmit coil(s) 110 generates an oscillating magnetic field in accordance with Ampere's law. The oscillating magnetic field induces an AC voltage into a tuned receiver coil 112 of a wireless power receiver 103 in accordance with Faraday's law. The AC voltage induced in the receiver coil 112 is applied to a rectifier 116 that generates an unregulated DC voltage. Rectifier 116 may be a synchronous rectifier including a control circuit as discussed herein, in some embodiments. The unregulated DC voltage is regulated using a DC/DC converter 118, which is filtered and provided to a load. In some alternate embodiments the DC/DC converter 118 can be replaced by a linear regulator or battery charger, or eliminated altogether.

The wireless power transmitter 102 may use a closed loop power control scheme. The power control scheme allows individual device power needs to be met while providing high efficiency and safe receiver operation. The sensing and communications circuit 117 of the wireless power receiver senses the power demands of the load by measuring the voltage and/or current at the input of the DC/DC converter 118. Instantaneous receiver power is fed back to the wireless power transmitter 102 using a communication channel, shown as the arrow labeled "Data" in FIG. 6. Any suitable communication channel may be used, and may be in accordance with wireless communication standards such as Bluetooth or Near Field Communication (NFC), or by modulating the receiver coil 112, by way of example and not limitation. The sensing and communications circuit 117 sends data regarding the power demands of the receiver to the wireless power transmitter 102. A detection and control circuit 115 of the wireless power transmitter 102 detects the signal from the wireless power receiver 103 and adjusts the output voltage of the DC/DC converter 104 in order to satisfy the power requirements of the wireless power receiver 103.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A control method for a synchronous rectifier, the synchronous rectifier comprising a plurality of switches, the synchronous rectifier receiving an AC input signal, the control method comprising:
   switching between
   A) performing rectification while controlling a first switch of the plurality of switches in response to a control signal for a second switch of the plurality of switches; and
   B) controlling the first switch in response to a comparison between the AC input signal and a second signal,
   wherein the first switch is a low-side switch and the second switch is a high-side switch, or the first switch is a high-side switch and the second switch is a low-side switch,
   wherein the plurality of switches further includes:

a third switch, the third switch being a high-side switch or a low-side switch, in series with the first switch; and a fourth switch, the fourth switch being a low-side switch or a high-side switch, in series with the second switch, wherein the switching between A and B is performed in response to a transition of the control signal for the second switch or a control signal for the third switch.

2. The control method of claim 1, wherein the first switch is a low-side switch and the second switch is a high-side switch.

3. The control method of claim 1, further comprising: switching between

C) controlling the fourth switch of the plurality of switches in response to a control signal for the third switch; and D) controlling the fourth switch in response to a comparison between a second AC input signal and the second signal.

4. The control method of claim 3, wherein the second signal is a common mode voltage.

5. The control method of claim 4, wherein the common mode voltage is ground.

6. The control method of claim 1, wherein the first switch is a high-side switch and the second switch is a low-side switch.

7. The control method of claim 3, wherein the second signal is a rectified output voltage of the synchronous rectifier.

8. The control method of claim 1, wherein A is performed when the first switch is turned off and B is performed when the first switch is turned on.

9. A control circuit for a synchronous rectifier, the synchronous rectifier comprising a plurality of switches, the synchronous rectifier receiving an AC input signal, the control circuit comprising:

circuitry configured to switch between

A) performing rectification while controlling a first switch of the plurality of switches in response to a control signal for a second switch of the plurality of switches; and B) controlling the first switch in response to a comparison between the AC input signal and a second signal, wherein the first switch is a low-side switch and the second switch is a high-side switch, wherein the plurality of switches further comprises:

a third switch, the third switch being a high-side switch in series with the first switch; and a fourth switch, the fourth switch being a low-side switch in series with the second switch, wherein the switching between A and B is performed in response to a transition of the control signal for the second switch or a control signal for the third switch.

10. The control circuit of claim 9, wherein the second signal is a common mode voltage.

11. The control circuit of claim 9, wherein the circuitry switches between

C) controlling the fourth switch of the plurality of switches in response to a control signal for the third switch; and D) controlling the fourth switch in response to a comparison between a second AC input signal and the second signal.

12. A control circuit for a synchronous rectifier, the synchronous rectifier comprising a plurality of switches, the synchronous rectifier receiving an AC input signal, the control circuit comprising:

circuitry configured to switch between

A) performing rectification while controlling a first switch of the plurality of switches in response to a control signal for a second switch of the plurality of switches; and B) controlling the first switch in response to a comparison between the AC input signal and a second signal, wherein the first switch is a high-side switch and the second switch is a low-side switch, wherein the plurality of switches further comprises:

a third switch, the third switch being a low-side switch in series with the first switch; and a fourth switch, the fourth switch being a high-side switch in series with the second switch, wherein the switching between A and B is performed in response to a transition of the control signal for the second switch or a control signal for the third switch.

13. The control circuit of claim 12, wherein the circuitry switches between

C) controlling the fourth switch of the plurality of switches in response to a control signal for the third switch; and D) controlling the fourth switch in response to a comparison between a second AC input signal and the second signal.

14. The control circuit of claim 13, wherein the second signal is a rectified output voltage of the synchronous rectifier.

* * * * *